(12) United States Patent
Cho et al.

(10) Patent No.: US 8,122,997 B2
(45) Date of Patent: Feb. 28, 2012

(54) SOUND INSULATION STRUCTURE WITH RESONATOR

(75) Inventors: Masaki Cho, Saitama (JP); Norihiko Sasaki, Saitama (JP); Masahiko Nakatsuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/372,960

(22) Filed: Feb. 18, 2009

(65) Prior Publication Data

US 2009/0205902 A1    Aug. 20, 2009

(30) Foreign Application Priority Data

Feb. 20, 2008    (JP) ................. 2008-039402

(51) Int. Cl.
    *G10K 11/00*      (2006.01)
    *G10K 11/04*      (2006.01)
    *F02B 77/00*      (2006.01)
    *F02B 77/04*      (2006.01)
    *F02B 77/13*      (2006.01)

(52) U.S. Cl. ..... 181/205; 181/200; 181/204; 123/195 C; 123/198 E

(58) Field of Classification Search .......... 181/205, 181/204; 123/195 C, 198 E
See application file for complete search history.

(56) References Cited

U.S. PATENT DOCUMENTS

| | | | | |
|---|---|---|---|---|
| 4,257,369 A | * | 3/1981 | Abe et al. ............ | 123/198 E |
| 4,498,433 A | * | 2/1985 | Ogawa ............... | 123/90.38 |
| 4,619,344 A | * | 10/1986 | Uesugi et al. .......... | 181/229 |
| 5,892,187 A | * | 4/1999 | Patrick .............. | 181/286 |
| 6,178,939 B1 | * | 1/2001 | Powell ............... | 123/184.21 |
| 6,805,219 B2 | * | 10/2004 | Yasuda et al. .......... | 181/204 |
| 7,093,569 B2 | * | 8/2006 | Nakatsuka et al. ...... | 123/41.44 |
| 7,152,403 B2 | * | 12/2006 | Yoshida .............. | 60/487 |
| 2002/0005191 A1 | * | 1/2002 | Maeda et al. .......... | 123/572 |
| 2004/0055813 A1 | * | 3/2004 | Tsuiki et al. ......... | 181/204 |
| 2005/0051384 A1 | * | 3/2005 | Breznik .............. | 181/269 |
| 2007/0007788 A1 | * | 1/2007 | Araga et al. .......... | 296/39.3 |
| 2008/0066997 A1 | * | 3/2008 | Wako et al. .......... | 181/175 |
| 2008/0314676 A1 | * | 12/2008 | Ishida ............... | 180/366 |
| 2009/0050391 A1 | * | 2/2009 | Nobuhira ............. | 180/219 |

FOREIGN PATENT DOCUMENTS

| | | | |
|---|---|---|---|
| JP | 8-144783 A | | 6/1996 |
| JP | 11303645 A | * | 11/1999 |
| JP | 2000282892 A | * | 10/2000 |
| JP | 2005-248838 A | | 9/2005 |
| JP | 2005-263143 A | | 9/2005 |
| JP | 2007056788 A | * | 3/2007 |

* cited by examiner

*Primary Examiner* — Elvin G Enad
*Assistant Examiner* — Christina Russell
(74) *Attorney, Agent, or Firm* — Birch, Stewart, Kolasch & Birch, LLP

(57) ABSTRACT

To enhance the noise reducing effect of a sound insulation structure which includes a cover member for covering a power unit from the outside so as to reduce the radiant sound generated from the power unit, and a resonator. A sound insulation structure includes an armor cover for covering a left case half and a left cover constituting a side part cover of the power unit from the left side so as to reduce the radiant sound generated from the side part cover and enhance an appearance quality of the power unit, and the resonator capable of resonating at a specified frequency of the radiant sound. The resonator is disposed in a space formed between the side part cover and the armor cover in the state of being out of contact with the armor cover, and is attached to the side part cover in contact with the latter.

26 Claims, 4 Drawing Sheets

SOUND INSULATION STRUCTURE WITH RESONATOR

CROSS-REFERENCE TO RELATED APPLICATIONS

This nonprovisional application claims priority under 35 U.S.C. §119(a) on Patent Application No. 2008-039402, filed in Japan on Feb. 20, 2008, the entirety of which is incorporated herein by reference.

BACKGROUND OF THE INVENTION

1. Field of the Invention

The present invention relates to a sound insulation structure including a cover member for reducing radiant sound generated from a power unit for generating motive power, and a resonator for reducing the radiant sound. More particularly, the present invention relates to the layout of the resonator in relation to the power unit and the cover member.

2. Background of the Invention

An internal combustion engine as a power unit is know to have a cover member attached thereto for reducing radiant sound generated from an internal combustion engine. A resonator is formed inside the cover member integrally with the cover member so as to reduce the noise in a space defined by the internal combustion engine and the cover member. In addition, a neck part of the resonator is opened into the space (refer to, for example, Japanese Patent Laid-open No. Hei 8-144783).

In addition, a system is known wherein a power unit includes an internal combustion engine and a transmission supplied with motive power of the internal combustion engine and in which the transmission is composed of a swash plate type hydrostatic continuously variable transmission (refer to, for example, Japanese Patent Laid-open No. 2005-248838 and Japanese Patent Laid-open No. 2005-263143).

SUMMARY OF THE INVENTION

In the case where a resonator disposed in a space formed between an internal combustion engine and a cover member covering the internal combustion engine is formed as one body with the cover member, the resonator itself is vibrated together with the cover member. The vibration of the resonator itself in this instance is, in many cases, a vibration at a frequency different from the specified frequency of the radiant sound to be reduced through resonance of the resonator. Particularly, in the case where the cover member is attached to the internal combustion engine through a vibration isolating member such as a rubber vibration isolator, the frequency of vibration of the resonator itself is more frequently different from the specified frequency. Therefore, in some cases, the reducing effect of the resonator on the radiant sound at the specified frequency has not been sufficiently obtainable.

The present invention has been made in consideration of the above-mentioned circumstances. Accordingly, an object of the present invention is to enhance the noise reducing effect of a sound insulation structure, which includes a cover member covering a power unit externally so as to reduce radiant sound generated from the power unit, and a resonator. Furthermore, an object of the present invention is to enhance the noise reducing effect of a resonator for the rider(s).

According to a first aspect of the present invention, a sound insulation structure includes a cover member (C1) with which a noise source device (P) generating a radiant sound is covered on the outside thereof from a predetermined direction thereof so as to reduce the radiant sound, and a resonator (120) which resonates at a specified frequency of the radiant sound, wherein the resonator (120) is disposed, out of contact with the cover member (C1), in a space (S) formed between the noise source device (P) and the cover member (C1), and is attached to and in contact with the noise source device (P).

According to a second aspect of the present invention, the cover member (C1) includes a cover part (Ca) covering the noise source device (P) from the predetermined direction, and an outer peripheral part (Cb) bent toward a direction opposite to the predetermined direction so as to approach the noise source device (P), the outer peripheral part (Cb) covers the noise source device (P) from an orthogonal direction orthogonal to the predetermined direction, and a sound absorbing material (115) is disposed in the space (S) along an inner surface (Ci) of the cover member (C1) and between the cover member (C1) and the resonator (120).

According to a third aspect of the present invention, the resonator (120) is mounted in the vicinity of an oscillation source (60) of the radiant sound at a specified frequency, and an aperture part (127) of a neck part (126) of the resonator (120) is opened in the space (S) in a direction along the cover member (C1) and in a sense (A1) toward the inner side in the space (S) in relation to the position of the aperture part (127).

According to a fourth aspect of the present invention, the noise source device (P) is a power unit (P) disposed below a rider's seat (9) in a motorcycle (V), the aperture part (127) is located on the front side relative to the seat (9), and the sense (A1) in which the aperture part (127) is opened is an upward sense.

According to the first aspect of the present invention, the radiant sound generated from the power unit in the space between the power unit and the cover member is reduced by the resonator disposed in the space. In this case, since the resonator is not in contact with the cover member, the vibration of the cover member is prevented from suppressing the vibration of the resonator itself being in a resonant state so as to hamper the resonance of the resonator. Moreover, since the resonator itself is attached directly to the power unit, the resonator itself is also oscillated directly at the specified frequency and, hence, the resonance at the specified frequency is promoted by the vibration of the resonator itself. As a result, the noise reducing effect of the resonator is enhanced, and the noise reducing effect of the sound insulation structure is enhanced.

According to the second aspect of the present invention, the cover member not only covers the noise source device from a predetermined direction with its cover part but also covers the noise source device from an orthogonal direction orthogonal to the predetermined direction with its outer peripheral part, and, therefore, the noise reducing effect of the cover member is enhanced.

In addition, by utilizing the fact that the resonator is not in contact with the cover member, the sound absorbing material can be disposed in the space over a wide range along the inner surface of the cover member, without being blocked by the resonator. As a result, in addition to the noise reducing effect of the resonator on the radiant sound at the specified frequency, the noise of the whole radiant sound inclusive of the radiant sound at the specified frequency can be reduced by the sound absorbing material disposed along the inner surface of the cover member, so that the noise reducing effect is enhanced.

According to the third aspect of the present invention, the aperture part of the resonator is opened toward the wider side of the space along the cover member defining the space, so that it is made easier for the resonance at the resonator to occur. In addition, since the neck part is opened in a direction along the cover member, the radiant sound at the specified frequency, of the radiant sounds transmitted along the cover member, can be reduced by the resonator.

Furthermore, the resonator is mounted in the vicinity of the oscillation source. Therefore, the resonator itself is effectively oscillated at the specified frequency, so that the resonance at the specified frequency is more promoted. As a result, the noise reducing effect of the resonator is enhanced, and the noise reducing effect of the sound insulation structure is enhanced.

According to the fourth aspect of the present invention, the radiant sound coming from the power unit toward the rider(s) on the motorcycle is effectively reduced by the resonator. Therefore, the noise reducing effect for the rider(s) is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
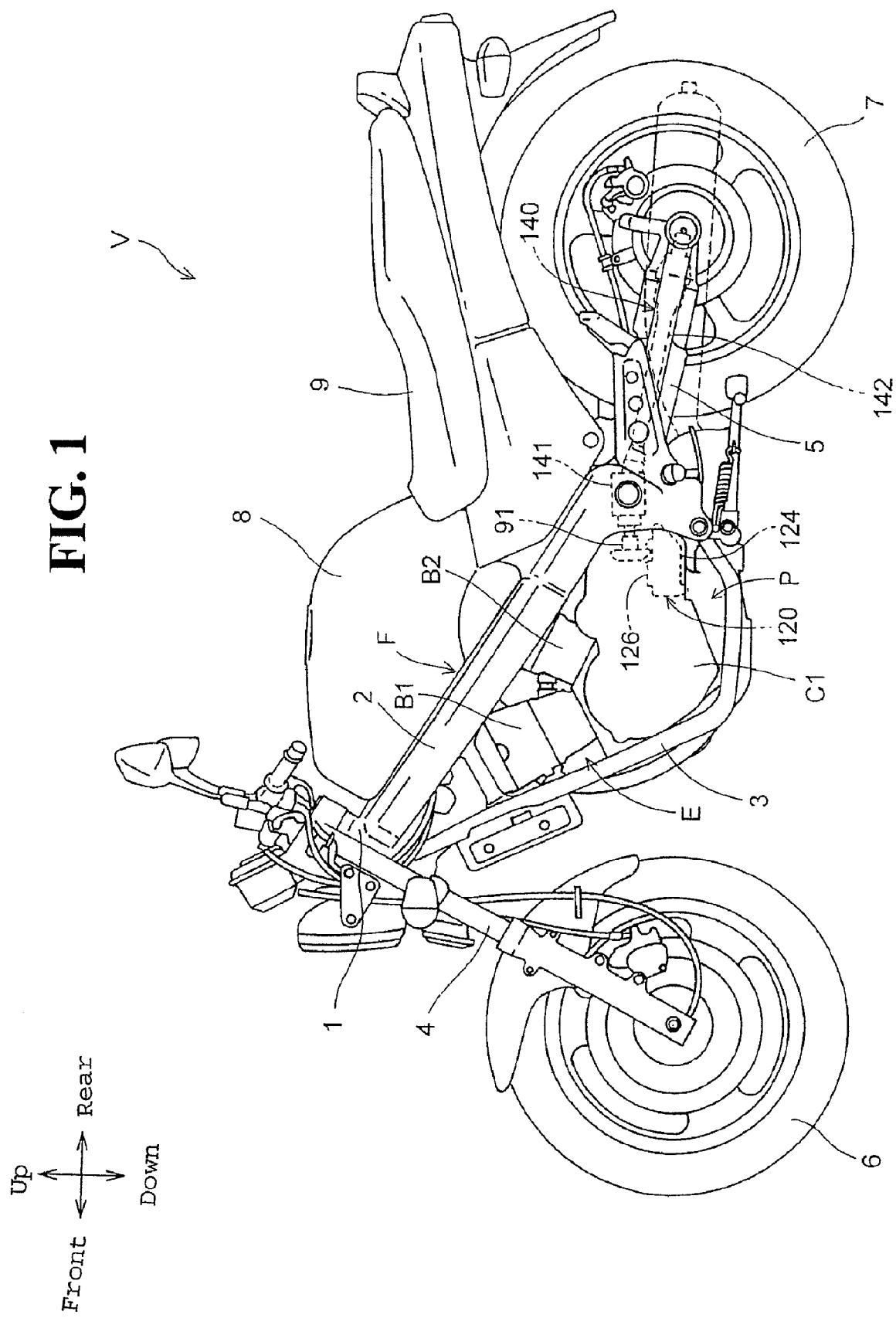
FIG. 1 is an essential part left side view of a motorcycle fitted with the sound insulation structure to which the present invention is applied.

The present invention will now be described in detail with reference to the accompanying drawings, wherein the same reference numerals will be used to identify the same or similar elements throughout the several views. Now, an embodiment of the present invention will be described referring to FIGS. 1 to 4.

Referring to FIG. 1, in this embodiment, a sound insulation structure to which the present invention is applied is provided in a motorcycle V as a vehicle. The sound insulation structure includes an armor cover C1 that covers a power unit P on the outside thereof, and a resonator 120, as will be described later.

In this embodiment, the left-right direction and the front-rear direction coincide with the left-right direction and the front-rear direction with respect to the motorcycle V on which the power unit P is mounted, and the up-down direction is the vertical direction. The axial direction, which term will be used in relation to each rotary shaft to be described later, means the direction of the axis of rotation of the shaft. The axial direction of a crankshaft 33 (see FIG. 3) provided in an internal combustion engine E coincides with the left-right direction in this embodiment. When either one of the rightward sense and the leftward sense is assumed to be one sense of the axial direction of the crankshaft 33, the other of the rightward sense and the leftward sense is the other sense of the axial direction of the crankshaft 33.

The motorcycle V includes: a body frame F having a head pipe 1, a main frame 2 and a down tube 3; a power unit P supported on the body frame F; a front wheel 6 rotatably supported on a front fork 4 steerably supported on the head pipe 1; a rear wheel 7 rotatably supported on a swing arm 5 swingably supported on the main frame 2; and a fuel tank 8 and a riders' seat 9 which are supported on the body frame F. The power unit P is disposed below the riders' seat 9 in the motorcycle V.

Figure 2:
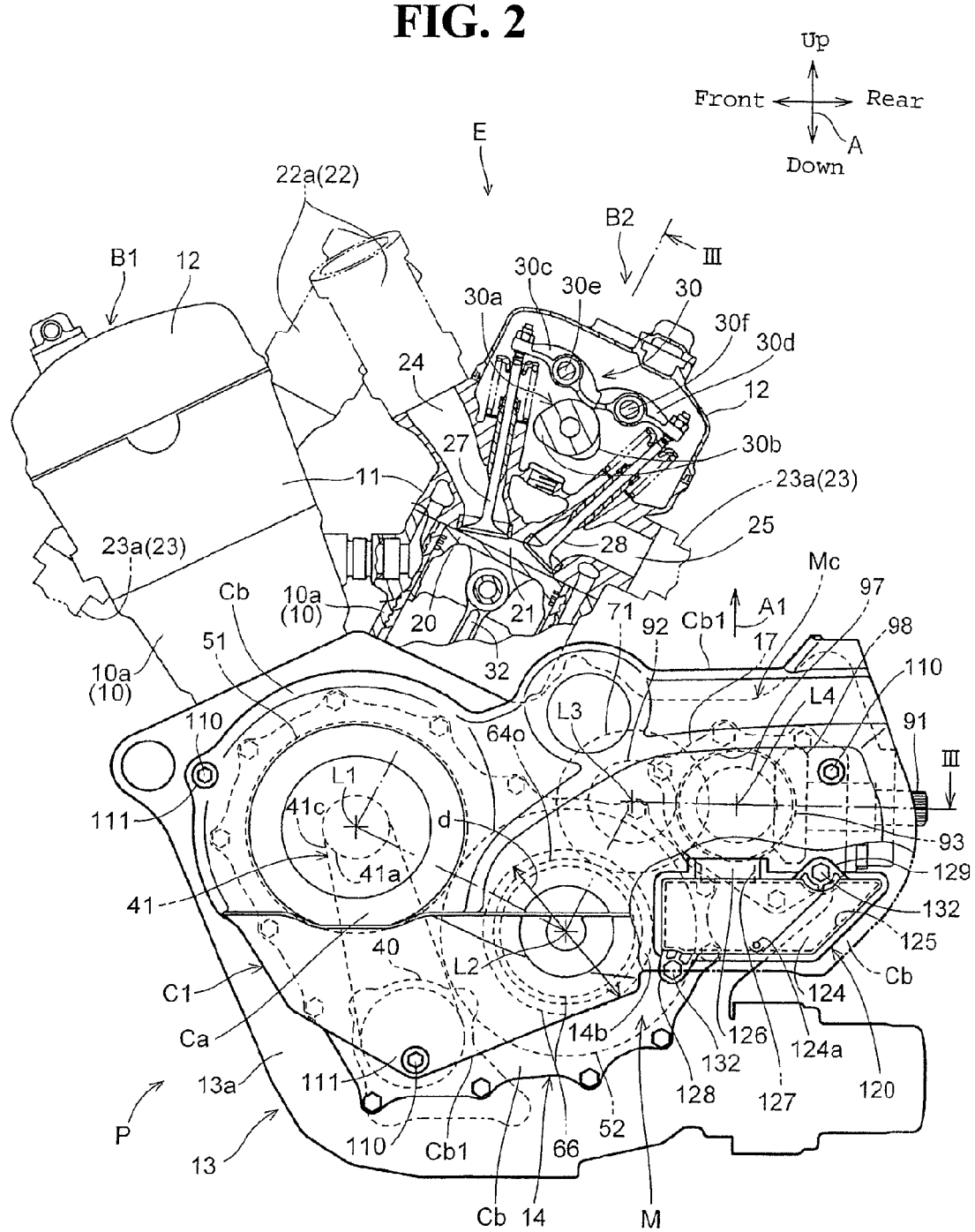
FIG. 2 is an essential part side view of a power unit provided in the motorcycle shown in FIG. 1.
Figures 3A, 3B:
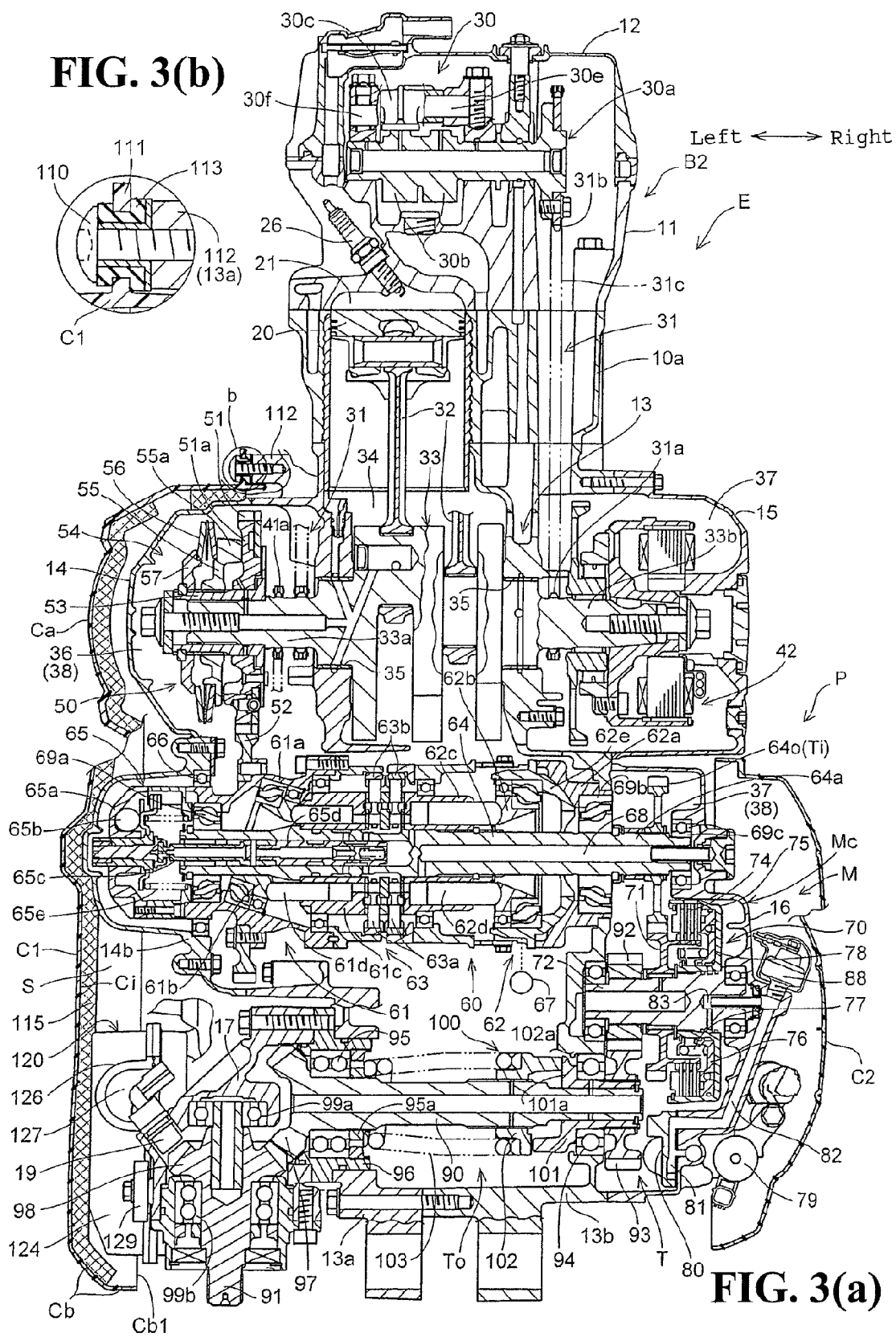
FIG. 3(*a*) is a sectional view taken along line III-III of FIG. 2, and FIG. 3(*b*) is an enlarged view of part b of FIG. 3(*a*); and, FIG. 4 is an enlarged view of a resonator shown in FIG. 3.

Referring to FIGS. 2 and 3, the power unit P includes an internal combustion engine E, which is a water-cooled type multi-cylinder 4-stroke internal combustion engine, and a mission unit M having a transmission 60 (see FIG. 3) to which motive power from the internal combustion engine E is inputted. The internal combustion engine E and the mission unit M constitute a united apparatus, which outputs motive power for driving the rear wheel 7 serving as an object of driving.

The internal combustion engine E supported on the body frame F in a transverse layout with the crankshaft 33 oriented in the vehicle width direction is a V-type internal combustion engine having a front bank B1 and a rear bank B2. The transmission 60 is a hydrostatic type continuously variable transmission having a hydraulic pump 61 and a hydraulic motor 62.

The motive power generated by the internal combustion engine E is inputted to the mission unit M, and is then transmitted from a power take-off shaft 91 of the mission unit M to the rear wheel 7, serving as a drive wheel, through a final transmission mechanism 140 having a drive shaft 142, which is connected to the power take-off shaft 91 through a universal joint 141. The final transmission mechanism 140 is contained in the swing arm 5.

The internal combustion engine E has an engine main body composed of: a cylinder block 10 having a plurality of (in this embodiment, two) cylinders 10*a* arranged so as to constitute a V-shaped pair of banks B1 and B2; a pair of cylinder heads 11 connected to upper end parts of the cylinders 10*a* in the banks B1 and B2, respectively; a pair of cylinder head covers 12 connected to upper end parts of the cylinder heads 11, respectively; and a crankcase 13 connected to a lower end part of the cylinder block 10.

Incidentally, both the banks B1 and B2 are basically the same in the structure pertaining to the cylinder 10*a*, the cylinder head 11 and the cylinder head cover 12. In the following, therefore, description will be made referring mainly to the structure of the rear bank B2.

Referring to FIGS. 2 and 3, the cylinder head 11 is provided with: a combustion chamber 21 opposed to a piston 20 in the cylinder axial direction; an intake port 24 through which a gaseous mixture of intake air fed from an intake system 22 having a throttle body 22*a* connected to the cylinder head 11 and a fuel from a fuel injection valve (not shown) is introduced into the combustion chamber 21; an exhaust port 25 through which an exhaust gas from the combustion chamber 21 is introduced into an exhaust system 23 having an exhaust pipe 23*a* connected to the cylinder head 11; a spark plug 26 fronting on the combustion chamber 21; and an intake vale 27 and an exhaust valve 28 for opening and closing the intake port 24 and the exhaust port 25, respectively.

A valve system 30 for opening and closing the intake valve 27 and the exhaust valve 28 includes a camshaft 30*a* having a valve cam 30*b*, and rocker arms 30*c*, 30*d* making contact with the intake valve 27 and the exhaust valve 28 and driven by the valve cam 30*b* to rock. The valve cam 30*b* opens and closes the intake valve 27 and the exhaust valve 28 through the rocker arms 30c, 30d rockably supported on rocker shafts 30e, 30f, respectively.

A valve-operating power transmission mechanism 31 for driving the camshaft 30a to rotate by a torque of the crankshaft 33 includes a drive sprocket 31a provided at both end parts 33a, 33b of the crankshaft 33, a cam sprocket 31b provided on the camshaft 30a, and a chain 31c wrapped around both the sprockets 31a, 31b.

The crankcase 13 is a left-right split crankcase having a configuration in which a pair of case halves 13a, 13b as case parts split into a plurality in the vehicle width direction (left-right direction) are coupled. The crankshaft 33, which is connected to pistons 20 through connecting rods 32, is contained in a crank chamber 34 formed by the crankcase 13, and is rotatably supported on both the case halves 13a, 13b through a pair of main bearings 35. A part of the crankcase 13 constitutes a mission case Mc of the mission unit M.

In addition, the internal combustion engine E has a pair of covers 14, 15 connected respectively to the left and right case halves 13a, 13b through a multiplicity of bolts.

Of the crankshaft 33, a shaft end part 33a on one side which projects leftwards from the inside of the crank chamber 34 extends into a power transmission chamber 36 formed as a left chamber by the left case half 13a and the left cover 14, and a shaft end part 33b on the other side which projects rightward from the inside of the crank chamber 34 extends into an accessory chamber 37 formed as a right chamber by the right case half 13b and the right cover 15. An input-side transmission mechanism 50 of the mission unit M and a drive sprocket 41a around which to wrap a chain 41c of a power transmission mechanism 41 for driving an oil pump 40 are provided at the shaft end part 33a. On the other hand, an AC generator 42 is provided at the shaft end part 33b. The mission unit M, the oil pump 40 and the AC generator 42 are all driven units which are driven by the torque of the crankshaft 33.

The mission unit M includes the transmission 60 driven to rotate by the torque of the crankshaft 33, the input-side transmission mechanism 50 for inputting the torque of the crankshaft 33 to the transmission 60, an output-side transmission mechanism T to which the torque outputted from the transmission 60 is inputted, and the mission case Mc forming a mission chamber 38 in which the transmission 60 and both the transmission mechanisms 50, T are contained.

The torque (or motive power) generated by the internal combustion engine E is transmitted from the crankshaft 33 serving as an engine output shaft to the rear wheel 7 (see FIG. 1) through a torque transmission path composed of the input-side power transmission mechanism 50, the transmission 60, the output-side power transmission mechanism T and the final transmission mechanism 140 (see FIG. 1) (hereinafter referred to as "torque transmission path"). The torque transmission path includes, with the transmission 60 as a boundary, an input-side transmission path between the crankshaft 33 and the transmission 60, the transmission 60 itself, and an output-side torque transmission path between the transmission 60 and the rear wheel 7. Therefore, the input-side torque transmission path is composed of the input-side transmission mechanism 50, whereas the output-side torque transmission path is composed of the output-side transmission mechanism T and the final transmission mechanism 140 to which the torque from the output-side transmission mechanism T is inputted.

The mission case Mc includes the pair of case halves 13a, 13b, the left cover 14 serving also as a left mission cover, the right cover 16 which is a right mission cover connected to the right case half 13b, and a gear cover 17 which is a cover connected to a rear part of the left case half 13a together with a bearing housing 96. Of the first and second power transmission chambers 36, 37 constituting the mission chamber 38, the first power transmission chamber 36 in which the transmission 60, the input-side transmission mechanism 50 and most part of the output-side transmission mechanism T exclusive of a part such as a running clutch 70 are disposed is defined by both the case halves 13a, 13b and the left cover 14, whereas the second transmission chamber 37 serving as a clutch chamber in which to dispose the running clutch 70 is defined by the right case half 13b and the right cover 16. The crankcase 13, the left cover 14, both the right covers 15, 16 and the gear cover 17 constitute a power case of the power unit P.

The input-side transmission mechanism 50 includes a gear mechanism 51, 52 for transmitting the torque of the crankshaft 33 to the transmission 60, and an input-side torque damper 54 for absorbing excess torque generated in the input-side torque transmission path.

The gear mechanism 51, 52 includes a drive gear 51 connected to the crankshaft 33 through a transmission mechanism, which is composed of a collar 53 spline fitted over the shaft end part 33a and an input cam member 55 spline fitted over the collar 53. A driven gear 52 is integrally rotatably provided on the pump housing 61a, which serves as an input rotary body in the transmission 60. The drive gear 51 is rotatably supported on the collar 53, and is provided at the shaft end part 33a through the collar 53.

The torque damper 54 of a cam type includes an input cam member 55 as an input member movable in the axial direction relatively to the shaft end part 33a. The drive gear 51 being an output cam member is an output member, which is engaged with the input cam member 55 and to which the torque of the crankshaft 33 is inputted through the input cam member 55. A damper spring 56 is an urging member for urging the input cam member 55 in the axial direction so as to bring the input cam member 55 into contact with the drive gear 51. The damper spring 56, which is composed of a plurality of disc springs, is disposed between a spring retainer 57 held by the collar 53 and the input cam member 55. The input cam member 55 has an input cam part 55a, whereas the drive gear 51 has an output cam part 51a. The input cam part 55a and the output cam part 51a make contact with each other in the axial direction and in the circumferential direction under the urging force of the damper spring 56, and are relatively slidable in the circumferential direction.

The torque damper 54 rotates the input cam member 55 and the drive gear 51 as one body when a torque of not more than a preset first set torque acts between the input cam member 55 and the drive gear 51. When an excess torque of more than the first set torque acts at the time of deceleration of the motorcycle V (see FIG. 1) or the internal combustion engine E or in similar situations, for example, at the time of engine brake of the motorcycle V, sliding in the circumferential direction occurs between the input cam member 55 and the drive gear 51. Therefore, the input cam member 55 and the drive gear 51 are rotated relative to each other while the input cam member 55 driven by the output cam part 51a is being moved in the axial direction against the urging force of the damper spring 56, whereby the excess torque is absorbed.

The transmission 60 is similar to the transmissions disclosed in the above-mentioned Japanese Patent Laid-open Nos. 2005-248838 and 2005-263143. The transmission 60 includes a swash plate type hydraulic pump 61, a swash plate type hydraulic motor 62, a valve mechanism 63 for controlling the flow of a working fluid between the hydraulic pump 61 and the hydraulic motor 62, a transmission output shaft 64 as an output rotary body, and an input-side clutch 65 which is a starting clutch for switching between stoppage and rotation of the transmission output shaft 64.

The hydraulic pump 61 includes a pump housing 61a rotatably supported on the left cover 14 through a bearing 66. A pump swash plate 61b is contained in the pump housing 61a. A pump body 61c is disposed opposite to the pump swash plate 61b in the axial direction. A plurality of pump plungers 61d are reciprocatably fitted in the pump body 61c and driven by the pump swash plate 61b to perform suction and discharge of the working fluid.

The hydraulic motor 62 includes a motor housing 62a fixed to the right case half 13b. A support member 62e is swingably supported on a spherical supporting surface formed as part of the motor housing 62a. A motor swash plate 62b is rotatably supported on the support member 62e. A motor body 62c is disposed opposite to the motor swash plate 62b in the axial direction. A plurality of motor plungers 62d is reciprocatably fitted in the motor body 62c and is driven by the working fluid discharged from the hydraulic pump 61. An electric motor 67 is provided as an actuator for driving the support member 62e. With the support member 62e driven by the electric motor 67 to swing, the inclination angle of the motor swash plate 62b is changed, whereby the rotating speed of the transmission output shaft 64 in relation to the rotating speed of the crankshaft 33 is changed, and the rotating speed of the crankshaft 33 is changed.

The valve mechanism 63 provided between the hydraulic pump 61 and the hydraulic motor 62 in the axial direction includes a plurality of spools 63a for controlling the flow of the working fluid as an oil discharged from the oil pump 40 and supplied from an oil passage formed in the right cover 16 through an oil passage 68 formed in the transmission output shaft 64. Control rings 63b are provided for controlling the positions of the spools 63a according to the rotating position of the pump housing 61a.

The transmission output shaft 64, which is spline fitted in the motor body 62c, is rotatably supported on the pump housing 61a, the motor housing 62a and the right cover 16 through bearings 69a, 69b, 69c, respectively. The transmission output shaft 64 has a rotational center line L2 parallel to the rotational center line L1 (see FIG. 2) of the crankshaft. In addition, rotational center lines L3 and L4 of an output shaft 72 and an intermediate shaft 90, which will be described later, are parallel to both the rotational center lines L1, L2.

The clutch 65, which is disposed at an end part nearer to the left cover 14 in the axial direction in the transmission 60, makes and breaks transmission of a torque from the driven gear 52 to the transmission output shaft 64. The clutch 65 includes an input member 65a rotated as one body with the pump housing 61a. A centrifugal weight is supported by the input member 65a and can be moved in the radial direction while being guided by the input member 65a under a centrifugal force generated according to the rotating speed of the input member 65a. An output member 65c can be moved in the axial direction according to the position of the centrifugal weight 65b and is rotated as one body with the input member 65a. A clutch spring 65e is disposed between the input member 65a and the output member 65c and presses the centrifugal weight 65b against the input member 65a through the output member 65c. The output member 65c has a spool 65d, which constitutes a spool valve with the transmission output shaft 64 as a sleeve.

When the engine rotating speed of the internal combustion engine E is not more than an idling speed, the clutch 65 is in a torque interruption position shown in FIG. 3. In this instance, the working fluid discharged from the hydraulic pump 61 returns to the hydraulic pump 61 without rotating the hydraulic motor 62. Besides, when the engine rotating speed exceeds the idling speed, the spool 65 is moved rightward while being driven by the centrifugal weight 65b moved radially outwards under a centrifugal force, and the clutch 65 takes a torque transmission position. With the clutch 65 in this torque transmission position, the working fluid discharged from the hydraulic pump 61 flows into the hydraulic motor 62, the hydraulic motor 62 is thereby driven to rotate, and the torque of the crankshaft 33 is transmitted to the transmission output shaft 64. In an engine rotating speed region in excess of the idling speed, the transmission output shaft 64 is rotated at a rotating speed changed according to the inclination angle of the motor swash plate 62b.

The output-side transmission mechanism T includes an input mechanism Ti composed of an output gear 64o provided on the transmission output shaft 64 and rotated as one body with the transmission output shaft 64. The running clutch 70 as an output-side clutch switches between a drive position and a neutral position by making and breaking the transmission of the torque from the transmission 60 to the rear wheel 7. An output mechanism To as a transmission mechanism transmits to the final transmission mechanism 140 (see FIG. 1) the torque transmitted from the transmission 60 through the running clutch 70.

The output gear 64o as the output rotary body is spline fitted over the shaft end part 64a, projecting rightwards from the bearing 69b to extend into the second power transmission chamber 37, of the transmission output shaft 64, and is meshed with an input gear 71 of the running clutch 70.

Referring to FIG. 3, the running clutch 70, which is a hydraulic type multiple-disk frictional clutch, includes an output shaft 72 as an output member which is rotatably borne on the right case half 13b and the right cover 16 through bearings. An input gear 71 as an input member is rotatably supported on the output shaft 72 and a torque from the transmission output shaft 64 serving as an input shaft is inputted through the output gear 64o. A plurality of clutch disks 74 are alternately stacked. A housing 75 as an intermediate member is spline fitted over the output shaft 72 and is rotated as one body with the latter. A pushing piston 76 as a pushing member is reciprocatably fitted in the housing 75 capable of transmitting to the output shaft 72 the torque from the input gear 71 transmitted through the clutch 74 in its connected state and is capable of pushing the clutch disks 74 to bring the latter into mutual contact. A clutch spring 77 urges the pushing piston 76 so as to separate the clutch disks 74 from each other.

The running clutch 70 as a hydraulic operating unit capable of operating by a hydraulic pressure is provided with a hydraulic pressure chamber 78 into which the working fluid for driving the pushing piston 76 is conducted, by the housing 75 and the pushing piston 76. The working fluid here is a portion of the oil discharged from the oil pump 40 (see FIG. 2) driven by a power transmission mechanism 41.

The hydraulic pressure in the hydraulic pressure chamber 78 is controlled by a hydraulic pressure controller for controlling the supply and discharge of the oil into and from the hydraulic pressure chamber 78. The hydraulic pressure controller is composed of a hydraulic pressure control valve 79 provided at the right cover 16 and controlled by a controller according to an operation of a speed change position operating member, and an oil circuit through which the oil controlled by the hydraulic pressure control valve 79 flows.

The oil circuit provided as a passage for supplying the oil into the hydraulic pressure chamber 78 and discharging the oil from the hydraulic pressure chamber 78 is composed of an oil passage formed in a connection member 80 connected to the hydraulic pressure control valve 79 having a part of the right cover 16 as a valve body. An oil passage 82 is connected to the oil passage 81 and is formed in the right cover 16. An oil passage 83 communicates between the oil passage 82 and the hydraulic pressure chamber 78.

In addition, in order to monitor the operating condition of the running clutch 70 by detecting the hydraulic pressure condition at the running clutch 70, a hydraulic pressure sensor 88 for detecting the hydraulic pressure in the oil circuit is mounted to the right cover 16. The hydraulic pressure sensor 88 detects the hydraulic pressure in the oil passage 82.

In the running clutch 70 as above, when the hydraulic pressure chamber 78 is supplied with a high-pressure oil and a high hydraulic pressure is established in the hydraulic pressure chamber 78, the pushing piston 76 presses the clutch disks 74 against the springy force of the clutch spring 77. This results in a connected condition in which the input gear 71 and the housing 75 are rotated as one body under the function of friction between the clutch disks 74, and the torque of the transmission output shaft 64 is transmitted through both the gears 64o and 71 to the output shaft 72. On the other hand, when the working fluid is discharged from the hydraulic pressure chamber 78 and a low hydraulic pressure is established in the hydraulic pressure chamber 78, the clutch disks 74 are separated from each other by the springy force of the clutch spring 77. This results in a disconnected condition in which the transmission of torque between the input gear 71 and the housing 75 is interrupted, and the transmission of the torque of the transmission output shaft 64 to the output shaft 72 is interrupted. In this manner, the supply and discharge of the oil into and from the hydraulic pressure chamber 78 through the oil passages 81, 82 and 83 are controlled, whereby the connection and disconnection of the running clutch 70 are controlled.

The above-mentioned output mechanism To includes an intermediate shaft 90 being a first power take-off shaft as a driven rotary shaft driven to rotate by the output shaft 72 serving as a driving rotary shaft. A second power take-off shaft 91 as a driven rotary shaft driven to rotate by the intermediate shaft 90 is operative to drive a drive shaft 142 (see FIG. 1) to rotate. A first transmission mechanism is disposed between the output shaft 72 and the intermediate shaft 90 in the output-side torque transmission path. The torque of the output shaft 72 is inputted to the intermediate shaft 90 through the first transmission mechanism. A second transmission mechanism is disposed between the intermediate shaft 90 and the power take-off shaft 91 in the output-side torque transmission path. The torque of the intermediate shaft 90 is inputted to the power take-off shaft 91 through the second transmission mechanism. An output-side torque damper 100 is disposed between the transmission 60 and the power take-off shaft 91 in the output-side torque transmission path and which absorbs an excess torque generated in the output-side torque transmission path.

The first transmission mechanism is composed of a drive gear 92 as a driving rotary body rotated as one body with the output shaft 72, and a driven gear 93 as an input rotary body which is meshed with the drive gear 92 and by which the torque of the output shaft 72 is inputted to the intermediate shaft 90. The driven gear 93 is so provided as to be spline fitted on an input cam member 101 of the torque damper 100 and to be rotated as one body with the input cam member 101, and is connected to the intermediate shaft 90 through the torque damper 100.

The intermediate shaft 90, at its shaft part on the right side, is rotatably supported on the right case half 13b through the input cam member 101 and a bearing 94. The intermediate shaft 90, at its shaft part on the left side, is supported on the left case half 13a through a bearing 95 and a bearing housing 96 connected to the left case half 13a. Of the intermediate shaft 90, a shaft end part protruding rightward from the bearing 94 is accompanied by a driven gear 93 through the input cam member 101, and a shaft end part protruding leftward from the bearing 94 is integrally provided with a drive gear 97.

The torque damper 100 of a cam type includes the input cam member 101 as an input member, which is rotatably supported on the intermediate shaft 90 and by which the torque of the output shaft 72 is inputted. An output cam member 102 as an output member is engaged with the input cam member 101. The torque from the input cam member 101 is transmitted to the intermediate shaft 90 by the output cam member 102. A damper spring 103 as an urging member for urging the output cam member 102 in the axial direction brings the latter into contact with the input cam member 101. The damper spring 103, which is composed of a coil spring, is disposed between a spring retainer 95a, which serves also as a stationary member of the bearing 95, and the output cam member 102.

The input cam member 101 is rotatably supported on the intermediate shaft 90, so that the driven gear 93 is also rotatably supported on the intermediate shaft 90. The input cam part 101a possessed by the input cam member 101 and the output cam part 102a possessed by the output cam member 102 are brought into mutual contact in the axial direction and in the circumferential direction by the urging force of the damper spring 103, and are relatively slidable in the circumferential direction. The torque damper 100 rotates the input cam member 101 and the output cam member 102 as one body when a torque of not more than the above-mentioned second set torque acts between both the cam members 101, 102. When an excess torque of more than the second set torque acts at the time of deceleration of the motorcycle V (see FIG. 1) or the internal combustion engine E or in similar situations, for example, at the time of engine brake of the motorcycle V, sliding in the rotating direction occurs between the input cam member 101 and the output cam member 102. Therefore, the input cam member 101 and the output cam member 102 are rotated relative to each other while the output cam member 102 is being driven by the input cam member 101 to move in the axial direction against the urging force of the damper spring 103, whereby the excess torque is absorbed.

The above-mentioned second transmission mechanism is composed of the drive gear 97 composed of a bevel gear, and a driven gear 98 composed of a bevel gear which is meshed with the drive gear 97 and which is formed as one body with the power take-off shaft 91.

The power take-off shaft 91 is disposed in the gear cover 17 connected to the left case half 13a, and is rotatably supported through a pair of bearings 99a, 99b. In addition, the gear cover 17 is provided with a rotating position sensor 19 for detecting the rotating position of the driven gear 98. The vehicle velocity is detected based on a detection signal generated by the sensor 19.

Referring to FIGS. 2 and 3, most part of the left case half 13a and the left cover 14 and the gear cover 17 (hereinafter the whole body of "the left case half 13a, the left cover 14 and the gear cover 17" will be referred to as "the side part cover," if necessary) constituting a side wall of the power unit P in the vehicle width direction (which is also the axial direction of the crankshaft 33) is covered with an armor cover C1 on the outside of the power unit P from the left side, which is a predetermined direction. Most part of the right case half 13b and the right cover 16 constituting another side wall of the power unit P in the vehicle width direction is covered with an armor cover C2 from the right side, which is the outside of the power unit P. Both the armor covers C1, C2, which are formed from a synthetic resin, are sound insulation covers as cover members that enhance the appearance quality of the power unit P and reduce the radiant sound generated by the power unit P.

The armor cover C1 reduces the radiant sound generated by the side part cover, mainly the radiant sound generated by the left cover 14. Incidentally, in the following description, "the radiant sound" means the radiant sound generated by the side part cover, unless otherwise specified.

The armor cover C1 is fixed to mounting seats 112 provided in the left case half 13a, the left cover 14 and the gear cover 17 (in FIG. 3, the mounting seat 112 provided in the left case half 13a is shown) by bolts 110 at a plurality of, specifically three, mounting parts 111. The armor cover C1 covers substantially the whole body of the left cover 14, exclusive of a lower edge part of the left cover 14, and the whole body of the gear cover 17, from the left side. The armor cover C1 is mounted to the mounting seats 112 through a vibration isolating material 113 (see FIG. 3(b)) composed of an elastic material having rubber-like elasticity, at the mounting parts 111. Therefore, the vibration of the armor cover C1 is reduced by the vibration isolating material 113, so that the noise generated by the armor cover C1 is reduced.

A space S is formed between the side part cover and the armor cover C1, which are so disposed as to form a spacing in the left-right direction. The armor cover C1 has a cover part Ca, which covers the side part cover from the left side. An outer peripheral part Cb is bent from the cover part Ca toward the right side opposite to the left side, so as to approach the power unit P, and thereafter extends rightward substantially in parallel. The outer peripheral part Cb covers at least a part of the side part cover from an orthogonal direction (hereinafter referred to as "the orthogonal direction") orthogonal to the axial direction. Therefore, the armor cover C1 covers the side part cover to surround the side part cover from the left side and from the orthogonal direction, so that the radiant sound reducing effect of the armor cover C1 is enhanced.

For reducing the radiant sound, the armor cover C1 is provided with a sound absorbing material 115 which is composed of a foamed material (for example, polyurethane foam) and is disposed along an inner surface Ci fronting on the space S. The sound absorbing material 115 is attached over the whole area of the inner surface Ci of the cover part C1, and is adhered to the inner surface Ci with an adhesive or the like. Furthermore, the sound absorbing material 115 is also disposed between the outer peripheral part Cb and the left cover 14 in the orthogonal direction in the state of making contact with the left cover 14, and is disposed also between a resonator 120 which will be described later and the armor cover C1. Incidentally, while the sound absorbing material 115 is disposed in contact with the resonator 120 in this embodiment, the sound absorbing material 115 may be so disposed as to form a gap between itself and the resonator 120 and to be out of contact with the resonator 120.

Therefore, the resonator 120 is disposed in the space S while being located between the sound absorbing material 115 and the side part cover and being out of contact with the armor cover C1. In the space S, the resonator 120, which is capable of resonating at a specified frequency of the radiant sound, is disposed between the sound absorbing material 115 and the side part cover.

Figure 4:
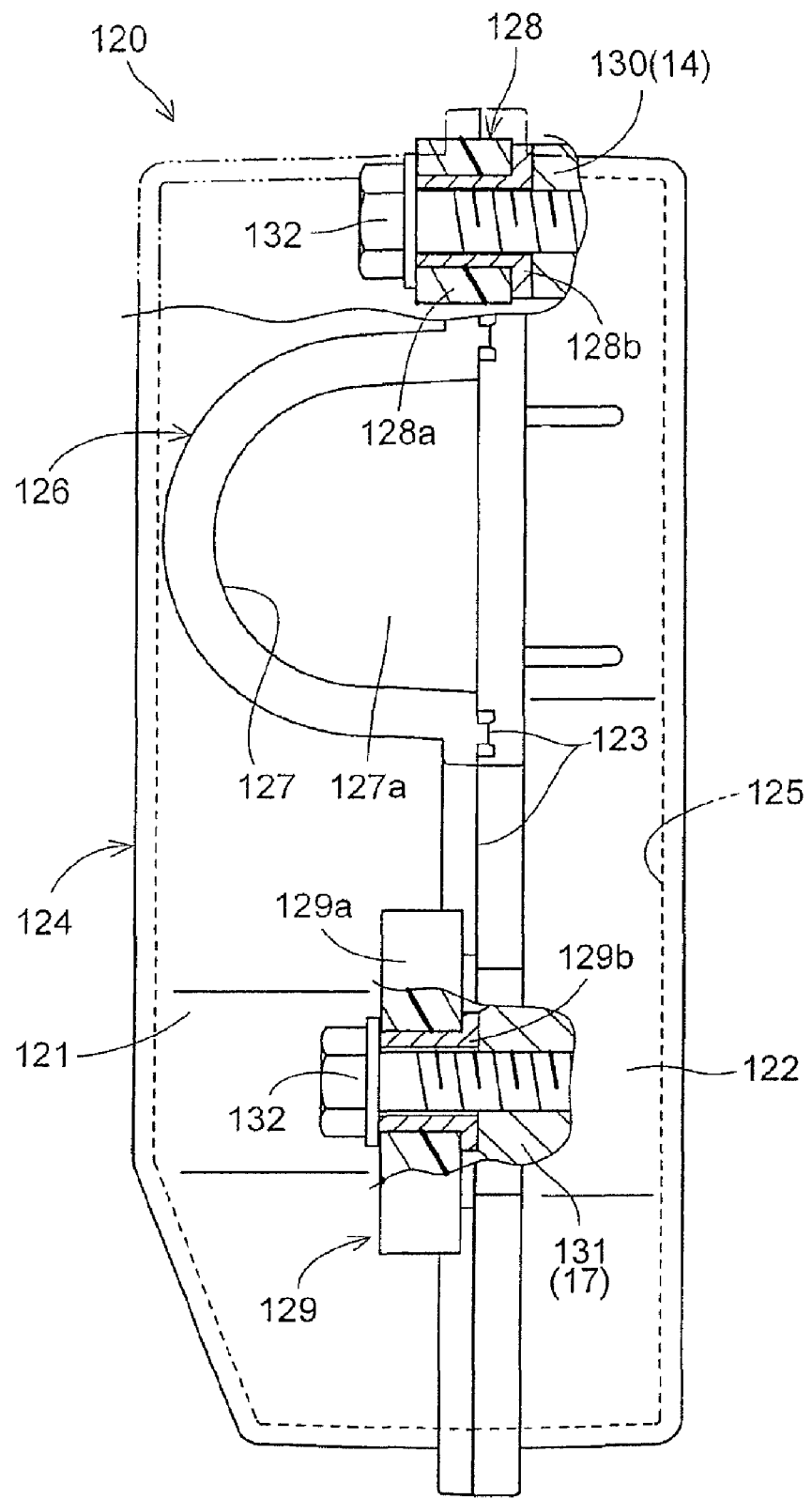

Referring to FIG. 4, the resonator 120 as a member separate from the power unit P and the armor cover C1 includes an inside volume part 124, which has a synthetic resin-made first case 121 and a synthetic resin-made second case 122 coupled gas-tightly to each other at a connecting part 123 by welding and which forms a resonance chamber 125. A straight tube-like neck part 126 forms an aperture part 127 for communication between the resonance chamber 125 and the space S. Mounting parts 128, 129 are connected to the left cover 14 and the gear cover 17. Most part of the resonator 120, inclusive of the whole body of the neck part 126, is disposed in the space S. Substantially the whole part of the resonator 120 is covered with the armor cover C1 from the left side (see FIG. 2).

The inside volume of the resonance chamber 125 and the passage area and length of the aperture part 127 (namely, the inside volume of the aperture part 127) are so set as to reduce the radiant sound at the specified frequency, in order to particularly enhance the reducing effect on the noise among the radiant sounds. In this embodiment, the oscillation source of the radiant sound at the specified frequency is the transmission 60. Therefore, the vibration of the transmission 60 vibrates at the specified frequency the side part cover inclusive of the left cover 14, to which the bearing 66 as a support member for supporting the transmission 60 is attached, whereby the radiant sound at the specified frequency is generated.

The aperture part 127 is a column-shaped passage having an axis parallel to the vertical direction, and has a passage section of the same shape in the axial direction. The aperture part 127 is opened in the space S in a direction along the armor cover C1 and in a sense A1 (in this embodiment, a sense in the vertical direction) toward the inner side in the space S in relation to the position of the aperture part 127. The sense A1 toward the inner side is that sense of the direction A (in this embodiment, coincident with the vertical direction) parallel to the aperture part 127 (or the axis of the aperture part 127) in which the distance from the aperture end 127a on the space S side of the aperture part 127 to an edge part Cb1 of the outer peripheral part Cb of the armor cover C1 increases. Therefore, in relation to the aperture part 127, a wider space S in the direction A is present in the sense A1 than in the sense (in this embodiment, the downward sense in the vertical direction) opposite to the sense A1.

In addition, the aperture part 127 of the neck part 126 is located on the front side relative to the seat 9 (see FIG. 1). While the sense A1 in which the aperture part 127 is opened is the upward sense parallel to the vertical direction (in other words, straight above) in this embodiment, the sense may be an upward sense inclusive of skew upward senses in addition to the straight-above sense.

The mounting parts 128, 129 are composed of main body parts 128a, 129a formed integrally with the inside volume part 124. Collars 128b, 129b, which are metallic reinforcing members, are fixed by being press fit onto the main body parts 128a, 128b. The pair of mounting parts 128, 129 are respectively connected by bolts 132 as connecting means inserted in the collars 128b, 129b, in the condition where the collars 128b, 129b are in contact with boss-shaped mount seats 130, 131 provided in the left cover 14 and the gear cover 17. Therefore, the resonator 120 is mounted directly to the side part cover, without any vibration isolating material therebetween. It is therefore mounted in contact with the side part cover. Accordingly, the vibration of the left cover 14 and the gear cover 17 is transmitted directly to the resonator 120 via the collars 128b, 129b.

The resonator 120 is attached to those parts of the mounting parts 128, 129, which are in the vicinity of the bearing 66, or that part of the left cover 14, which is in the vicinity of the mounting part 14b fitted with the bearing 66. Therefore, the vibration of the side part cover, particularly the vibration of the left cover 14 fitted with the bearing 66, is transmitted to the resonator 120 and the resonator 120 itself is vibrated together with the side part cover inclusive of the left cover 14. The vicinity is such a portion that the distance between the bearing 66 and that part of the collar 128b of the mounting part 128, which is in contact with the left cover 14 as viewed from the left side, is not more than ½ times the maximum width d (see FIG. 2) in the orthogonal direction of the range surrounded by the bearing 66 as viewed from the left side.

In addition, the inside volume part 124 is provided with a drain hole 124a (see FIG. 2) for draining water upon penetration of water via the aperture part 127. By changing the size of the drain hole 124a, the resonance frequency of the resonator 120 can be controlled.

Now, the operation and effects of this embodiment configured as above will be described below.

In the sound insulation structure including the armor cover C1 for covering the power unit P generating the radiant sound from the side part cover composed of the left case half 13a, the left cover 14 and the gear cover 17 from the left side as the predetermined direction so as to reduce the radiant sound and for enhancing the appearance quality of the power unit P, and the resonator 120 capable of resonating at a specified frequency of the radiant sound, the resonator 120 is disposed in the space S formed between the side part cover as a side wall of the power unit P and the armor cover C1 in the state of being out of contact with the armor cover C1 and is attached to the side wall cover in contact with the latter, whereby the radiant sound generated from the side part cover in the space S between the power unit P and the armor cover C1 is reduced by the resonator 120 disposed in the space S. In this case, the resonator 120 and the armor cover C1 are not in contact with each other. Therefore, the vibration of the armor cover C1 is prevented from suppressing the vibration of the resonator 120 itself, which is in a resonating state, so as to hinder the resonance of the resonator 120. Moreover, since the resonator 120 is attached directly to the side part cover, the resonator 120 itself is also directly oscillated at the specified frequency, the resonance at the specified frequency is promoted by the vibration of the resonator 120 itself. As a result, the noise reducing effect of the resonator 120 is enhanced, and the nose reducing effect of the sound insulation structure is enhanced.

The armor cover C1 includes the cover part covering the side part cover from the left side, and the outer peripheral part Cb bent toward the side (right side) opposite to the left side so as to approach the side part cover. The outer peripheral part Cb covers the side part cover from the above-mentioned orthogonal direction. The sound absorbing material 115 is disposed in the space S along the inner surface Ci of the armor cover C1 and between the armor cover C1 and the resonator 120. According to this structure, the armor cover C1 covers the side part cover also from the orthogonal direction with the outer peripheral part Cb, in addition to the covering with the cover part Ca, so that the noise reducing effect of the armor cover C1 is enhanced. In addition, by utilizing the fact that the resonator 120 and the armor cover C1 are not in contact with each other, the sound absorbing material 115 can be disposed in the space S over a wide range along the inner surface of the armor cover C1, without being blocked by the resonator 120.

As a result, in addition to the noise reducing effect of the resonator 120 on the radiant sound at the specified frequency, the noise of the whole radiant sounds inclusive of the radiant sound at the specified frequency can be reduced by the sound absorbing material 115 disposed along the inner surface Ci of the armor cover C1, so that the noise reducing effect is enhanced.

The resonator 120 is mounted in the vicinity of the bearing 66 for rotatably bearing the transmission 60, which is the oscillation source of the radiant sound at the specified frequency. The aperture part 127 of the neck part 126 of the resonator 120 is opened in the space S in a direction along the inner surface Ci of the armor cover C1 and in the sense toward the inner side in the space S in relation to the position of the aperture part 127, whereby the resonance at the resonator 120 is made to occur more easily. In addition, since the neck part 126 is opened to the direction along the armor cover C1, sounds are propagated along the armor cover C1 or the sound absorbing material 115. Therefore, it is possible to effectively reduce by the resonator 120 the radiant sound at the specified frequency, among the radiant sounds on which the noise reducing effect of the armor cover C1 or the sound absorbing material 115 is slight. Furthermore, since the resonator 120 is mounted in the vicinity of the bearing 66 supporting the transmission 60 serving as an oscillation source, the resonator 120 itself is effectively oscillated at the specified frequency, so that the resonance at the specified frequency is more promoted.

Consequently, the noise reducing effect of the resonator 120 is enhanced, and the noise reducing effect of the sound insulation structure is enhanced.

The power unit P is disposed below the rider' seat 9 in the motorcycle V, the aperture part 127 of the resonator 120 is located on the front side relative to the seat 9, and the aperture part 127 is opened in an upward direction. Therefore, the radiant sound coming from the side part cover toward the rider(s) on the motorcycle V is effectively reduced by the resonator 120. Hence, the noise reducing effect for the rider (s) is enhanced.

Now, a mode obtained by partly modifying the above-described embodiment will be described below, the description being centered on the modified part.

The cover member may include only the crankcase 13 of the internal combustion engine E or the side part cover or include both the crankcase 13 and the side part cover, and may cover the engine main body other than the crankcase 13, for example, the cylinder blocks 10 and the cylinder heads 11 from the outside.

The noise source device, which generates the radiant sound, may be a unit or apparatus other than the power unit P.

The power unit P for driving the object of driving may not necessarily be a unit obtained by integrating the internal combustion engine E and the mission unit as in the above-described embodiment, and may be composed of only the internal combustion engine or the mission unit, or may be composed of an engine other than the internal combustion engine.

The internal combustion engine may be a multi-cylinder internal combustion engine other than the V-type 2-cylinder internal combustion engine, or may be a single-cylinder internal combustion engine. Furthermore, the transmission may be a hydrostatic continuously variable transmission other than the swash plate type, or a continuously variable transmission other than the hydraulic type, or a transmission other than the continuously variable transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sound insulation structure comprising:
a cover member that covers an outside of a noise source device, the noise source device generating a radiant sound, the cover member covering the noise source device from a predetermined direction thereof so as to reduce said radiant sound; and
a resonator that resonates at a specified frequency of said radiant sound,
wherein said resonator is disposed, out of contact with said cover member, in a space formed between said noise source device and said cover member, and is attachable in contact with said noise source device, and
wherein a sound absorbing material is disposed in said space along an inner surface of said cover member and between said cover member and said resonator, and
wherein an aperture part of a neck part of said resonator is opened in said space.

2. The sound insulation structure according to claim 1, wherein the sound absorbing material is in contact with said cover member and said resonator.

3. The sound insulation structure according to claim 1, wherein said resonator is fully out of contact with said cover member.

4. The sound insulation structure according to claim 1, wherein said resonator is mounted in a vicinity of an oscillation source of said radiant sound of a specified frequency, and the aperture part of the neck part of said resonator is opened in said space in a direction along said cover member and in a sense toward the inner side in said space in relation to the position of said aperture part.

5. The sound insulation structure according to claim 4, wherein said noise source device is a power unit disposed below a rider's seat in a motorcycle, said aperture part is located on the front side relative to said seat, and said sense in which said aperture part is opened is an upward sense.

6. The sound insulation structure according to claim 1, wherein said resonator includes an outer case, and the outer case is in contact with the sound absorbing material.

7. The sound insulation structure according to claim 6, wherein a resonance chamber located in the outer case is spaced apart from the sound absorbing material by the outer case.

8. The sound insulation structure according to claim 1, wherein said cover member includes:
a cover part covering said noise source device from said predetermined direction; and
an outer peripheral part bent toward a direction opposite to said predetermined direction so as to approach said noise source device.

9. The sound insulation structure according to claim 8, wherein said outer peripheral part covers said noise source device from an orthogonal direction orthogonal to said predetermined direction.

10. The sound insulation structure according to claim 9, wherein said resonator is mounted in a vicinity of an oscillation source of said radiant sound of a specified frequency, and the aperture part of the neck part of said resonator is opened in said space in a direction along said cover member and in a sense toward the inner side in said space in relation to the position of said aperture part.

11. The sound insulation structure according to claim 10, wherein said noise source device is a power unit disposed below a rider's seat in a motorcycle, said aperture part is located on the front side relative to said seat, and said sense in which said aperture part is opened is an upward sense.

12. The sound insulation structure according to claim 8, wherein said resonator is mounted in a vicinity of an oscillation source of said radiant sound of a specified frequency, and the aperture part of the neck part of said resonator is opened in said space in a direction along said cover member and in a sense toward the inner side in said space in relation to the position of said aperture part.

13. The sound insulation structure according to claim 12, wherein said noise source device is a power unit disposed below a rider's seat in a motorcycle, said aperture part is located on the front side relative to said seat, and said sense in which said aperture part is opened is an upward sense.

14. A sound insulation structure comprising:
a noise source, said noise source generating a radiant sound at a specified frequency;
a cover member that covers an outside of a noise source device from a predetermined direction thereof so as to reduce said radiant sound; and
a resonator that resonates at said specified frequency of said radiant sound,
wherein said resonator is disposed, out of contact with said cover member, in a space formed between said noise source device and said cover member, and is attached to and in contact with said noise source device, and
wherein a sound absorbing material is disposed in said space along an inner surface of said cover member and between said cover member and said resonator, and
wherein an aperture part of a neck part of said resonator is opened in said space.

15. The sound insulation structure according to claim 14, wherein the sound absorbing material is in contact with said cover member and said resonator.

16. The sound insulation structure according to claim 14, wherein said resonator is fully out of contact with said cover member.

17. The sound insulation structure according to claim 14, wherein said resonator is mounted in a vicinity of an oscillation source of said radiant sound of a specified frequency, and the aperture part of the neck part of said resonator is opened in said space in a direction along said cover member and in a sense toward the inner side in said space in relation to the position of said aperture part.

18. The sound insulation structure according to claim 17, wherein said noise source device is a power unit disposed below a rider's seat in a motorcycle, said aperture part is located on the front side relative to said seat, and said sense in which said aperture part is opened is an upward sense.

19. The sound insulation structure according to claim 14, wherein said resonator includes an outer case, and the outer case is in contact with the sound absorbing material.

20. The sound insulation structure according to claim 19, wherein a resonance chamber located in the outer case is spaced apart from the sound absorbing material by the outer case.

21. The sound insulation structure according to claim 14, wherein said cover member includes:
a cover part covering said noise source device from said predetermined direction; and
an outer peripheral part bent toward a direction opposite to said predetermined direction so as to approach said noise source device.

22. The sound insulation structure according to claim 21, wherein said outer peripheral part covers said noise source device from an orthogonal direction orthogonal to said predetermined direction.

23. The sound insulation structure according to claim 22, wherein said resonator is mounted in a vicinity of an oscillation source of said radiant sound of a specified frequency, and the aperture part of the neck part of said resonator is opened in said space in a direction along said cover member and in a sense toward the inner side in said space in relation to the position of said aperture part.

24. The sound insulation structure according to claim 23, wherein said noise source device is a power unit disposed below a rider's seat in a motorcycle, said aperture part is located on the front side relative to said seat, and said sense in which said aperture part is opened is an upward sense.

25. The sound insulation structure according to claim 21, wherein said resonator is mounted in a vicinity of an oscillation source of said radiant sound of a specified frequency, and the aperture part of the neck part of said resonator is opened in said space in a direction along said cover member and in a sense toward the inner side in said space in relation to the position of said aperture part.

26. The sound insulation structure according to claim 25, wherein said noise source device is a power unit disposed below a rider's seat in a motorcycle, said aperture part is located on the front side relative to said seat, and said sense in which said aperture part is opened is an upward sense.

* * * * *